United States Patent [19]

Collins et al.

[11] Patent Number: 4,623,414

[45] Date of Patent: Nov. 18, 1986

[54] PROCESS FOR PREPARING AN AQUEOUS UNDERTREAD ADHESIVE COMPOSITION

[75] Inventors: Wendell Collins, Adrian, Mich.; Howard L. Brooks, Sylvania, Ohio

[73] Assignee: SWS Silicones Corporation, Adrian, Mich.

[21] Appl. No.: 630,340

[22] Filed: Jul. 12, 1984

Related U.S. Application Data

[62] Division of Ser. No. 460,215, Jan. 24, 1983, Pat. No. 4,463,120.

[51] Int. Cl.$^4$ ................................................ C09J 5/02
[52] U.S. Cl. .................................. 156/307.5; 152/565; 156/96; 156/110.1; 156/334; 156/910; 427/207.1; 427/393.5
[58] Field of Search ...................... 156/307.5, 334, 96, 156/910, 110.1; 427/207.1, 493.5; 152/565

[56] References Cited

U.S. PATENT DOCUMENTS

| | | | |
|---|---|---|---|
| 2,721,148 | 10/1955 | Reading | 427/207.1 |
| 2,994,672 | 8/1961 | Geerdes | 427/207.1 |
| 3,335,041 | 8/1967 | Osborne | 156/304.5 |
| 3,411,970 | 11/1968 | Perrin | 156/307.5 |
| 3,476,642 | 11/1969 | Berg et al. | 156/307.5 |
| 3,843,484 | 10/1974 | Kamiyoshi et al. | 156/338 |
| 3,857,730 | 12/1974 | Kalafus et al. | 156/335 |
| 3,884,895 | 5/1975 | Eckert et al. | 156/307.5 |
| 4,026,744 | 5/1977 | Elmer | 156/335 |
| 4,285,756 | 8/1981 | Elmer | 156/334 |
| 4,539,365 | 9/1985 | Rhee | 156/910 |

*Primary Examiner*—Joseph L. Schofer
*Assistant Examiner*—J. M. Reddick

[57] ABSTRACT

A process for preparing an aqueous adhesive composition which comprises preparing a solvent dispersion by mixing rubber, carbon black, vulcanizing agent, tackifying resin and accelerator with sufficient organic solvent to form a solvent dispersion and thereafter emulsifying the solvent dispersion in the presence of water to form an aqueous emulsion. The aqueous emulsion may be used to bond unvulcanized rubber compounds, such as a tread stock to the carcass portion during the formation of a tire.

16 Claims, No Drawings

PROCESS FOR PREPARING AN AQUEOUS UNDERTREAD ADHESIVE COMPOSITION

This is a division of application Ser. No. 460,215, filed Jan. 24, 1983, now U.S. Pat. No. 4,463,120.

The present invention relates to adhesive compositions, particularly to aqueous adhesive compositions which may be used for bonding unvulcanized rubber compounds, and more particularly to a process for preparing aqueous adhesive emulsions which may be used for bonding tread stock to a carcass portion during the formation of a tire.

BACKGROUND OF THE INVENTION

Adhesive compositions such as those described in U.S. Pat. No. 3,335,041 to Osborne, which contain an organic solvent, natural rubber and polymers of conjugated dienes, have been used to bond tire tread stock. The use of organic solvents in these compositions has certain disadvantages. For example, the organic solvents pose a serious fire hazard. Also, the solvents are a serious health hazard to those that come in contact with the fumes. Moreover, when solvent recovery is required, this is an expensive operation, particularly with respect to equipment investment.

In view of the hazards associated with the use of organic solvents, it would be desirable to eliminate or at least substantially reduce the amount of organic solvent present in adhesive compositions which are used for bonding, for example, tread stock to a carcass portion during the building of a tire.

Aqueous compositions have been used heretofore for bonding polyester tire cords to rubber compounds. For example, U.S. Pat. No. 3,843,484 to Kamiyoshi et al describes a method for bonding a synthetic fibrous material to rubber by applying an aqueous dispersion containing a novolak resin which is derived from the reaction of a monohydroxy benzene and formaldehyde, a precondensate derived from the reaction of resorcinol and formaldehyde and a rubber latex. U.S. Pat. No. 3,857,730 to Kalafus et al describes a process for bonding rubber compounds to polyester reinforcing elements by employing a one-step dip process in which the dip consists essentially of an alkaline aqueous emulsion of a rubbery vinyl pyridine copolymer containing butadiene-styrene and 2-vinyl pyridine and a heat reactable 2,6-bis(2,4-dihydroxy phenylmethyl)4-chlorophenol composition. U.S. Pat. No. 4,026,744 to Elmer also discloses a method for bonding rubber compounds to reinforcing elements by using a dip process in which the dip contains an alkaline aqueous dispersion of a mixture of a rubbery vinyl pyridine/styrene/butadiene terpolymer and a lignin sulfonate-resorcinol-formaldehyde reaction product. U.S. Pat. No. 4,285,756 to Elmer describes an aqueous alkaline dispersion containing a rubbery polybutadiene and a water-soluble heat reactive phenolic resin which is useful as an adhesive for bonding polyamide or polyester reinforcing elements to ethylene-propylene-diene rubbery polymer compounds.

Although the above references disclose latex emulsions for bonding reinforcing elements such as tire cords to rubber compounds, these references do not describe a process for preparing aqueous emulsions containing natural and/or synthetic rubber compositions which may be employed as adhesive compositions for bonding tread stock to tire carcasses.

Therefore, it is an object of the present invention to provide an aqueous adhesive composition for bonding unvulcanized rubber compounds. Another object of this invention is to provide an aqueous emulsion for bonding unvulcanized rubber compounds. Still another object of the present invention is to provide a method for bonding unvulcanized rubber compounds together. A further object of this invention is to provide a method for bonding rubber compounds together using an aqueous adhesive composition.

SUMMARY OF THE INVENTION

The foregoing objects and others which will become apparent from the following description are accomplished in accordance with this invention, generally speaking, by providing a process for preparing an aqueous adhesive composition for bonding rubber compounds which comprises mixing rubber selected from the class consisting of natural rubber, synthetic rubber, and mixtures thereof, with a reinforcing agent, a vulcanizing agent, a tackifying resin, an accelerator and sufficient organic solvent to form a solvent dispersion and thereafter emulsifying the solvent dispersion in the presence of water to form an aqueous emulsion. The aqueous emulsion is applied to at least one of the two surfaces to be bonded, dried to remove the water and then the surfaces are brought into contact with each other and vulcanized.

DESCRIPTION OF THE INVENTION

Any natural or synthetic rubber may be employed in the adhesive compositions of this invention. Examples of suitable rubbers are polyisoprene, acrylonitrile-butadiene rubbers, styrene-butadiene rubbers, neoprene, butyl rubber, polybutadienes and ethylene-propylene-diene rubbery polymers. The diene used in the ethylene-propylene-diene polymer is usually a nonconjugated diene such as any one or more of those generally known to the art, e.g., 1,4-hexadiene, ethylidene norbornene or dicyclopentadiene. Rubbery or elastomeric ethylene-propylene-diene polymers and methods for preparing them are described in, for example, "Rubber Chemistry and Technology", Volume 45, No. 1, March 1972. It is preferred that a mixture of natural rubber and synthetic rubber be employed in the adhesive compositions.

Although the adhesive composition may consist only of natural rubber or synthetic rubber, it is preferred that the composition contain from about 30 to 100 parts by weight of natural rubber and from about 70 to 0 parts by weight of synthetic rubber based on a total of 100 parts of rubber. Furthermore, it is preferred that the adhesive composition contain from 50 to 90 parts by weight of natural rubber and from 50 to 10 parts by weight of a synthetic rubber such as styrene-butadiene. Of course, other synthetic rubbers may be used instead of or in combination with styrene-butadiene.

The adhesive composition of this invention contains suitable proportions of compounding ingredients which are generally found in rubber compounds to which it is applied. The accelerator, for example, is preferably compatible with the accelerator in the rubber compound to which the adhesive is applied and should be compatible with the other ingredients of the rubber compound. Conversely, the accelerator in the rubber compound should be compatible with the ingredients of the adhesive.

Accelerators which may be employed in the adhesive compositions are compounds such as thiuram disulfide, selenium diethyldithiocarbamate, zinc dibutyldithiocarbamate zinc diethyldithiocarbamate, zinc dimethyldithiocarbamate, zinc 2,2'-dithiobisbenzothiazole, tetramethylthiuram monosulfide, diphenylquanidine, N-cyclohexyl-2-benzothiazole sulfenamide, N-tert-butyl-2-benzothiazole sulfenamide, 2-mercaptobenzothiazole and benzothiazyl disulfide.

Other conventional compounding ingredients which are employed in the adhesive composition of this invention are rubber reinforcing agents. An example of a suitable reinforcing agent is carbon black, which has an average surface area of from about 30 to 150 m$^2$/g and more preferably from about 70 to 100 m$^2$/g.

The amount of reinforcing carbon black employed will generally range from about 10 to 40 parts by weight and more preferably from about 10 to 30 parts by weight per 100 parts of rubber.

Other conventional compound ingredients included in the adhesive composition of this invention are vulcanizing agents such as elemental sulfur and sulfur containing compounds. Other vulcanizing agents which may be employed are organic peroxides, metallic oxides, selenium and tellurium. Generally, the amount of vulcanizing agent present in the adhesive composition will vary somewhat with the amount of rubber. Preferably, the amount of vulcanizing agent will range from about 1 to 8 parts and more preferably from about 1 to about 3 parts by weight per 100 parts of rubber.

Examples of other compounding ingredients which may be employed in the adhesive composition are zinc oxide, magnesium oxide and fatty acids having from 10 to 22 carbon atoms, such as lauric acid, palmitic acid and stearic acid. Mixtures of fatty acids may also be used as accelerators in the adhesive compositions.

The amount of zinc oxide and/or magnesium oxide will usually range from about 1 to 8 parts by weight and more preferably from about 1 to 5 parts by weight per 100 parts by weight of rubber.

The amount of fatty acid present in the adhesive composition of this invention may range from about 1 to 5 parts by weight and more preferably from about 1 to 3 parts by weight per 100 parts by weight of rubber.

The adhesive composition of this invention, is preferably prepared as a solvent dispersion and then the solvent dispersion is emulsified with water and an emulsifying agent. In preparing the solvent dispersion, the rubber is preferably milled with other rubber compounding ingredients such as vulcanizing agents and accelerators; then mixed with suitable organic solvents to form a solvent dispersion.

Examples of suitable organic solvents are aliphatic hydrocarbons such as heptane and octane; cyclic hydrocarbons such as cyclohexane; aromatic hydrocarbons such as benzene, toluene, xylene, naphtha solvent and chlorinated hydrocarbons such as methylene chloride, chloroethylene and the like.

The amount of solvent employed in the solvent dispersion is not critical and may range from about 300 to about 600 parts and more preferably from about 350 to 500 parts by weight of solvent per 100 parts by weight of rubber. Obviously, the amount of solvent should be kept to a minimum; however, sufficient solvent should be employed to disperse the rubber.

The solvent dispersion is preferably combined with a tackifying resin and then emulsified with water and an emulsifying agent to form an aqueous emulsion. However, the tackifying resin may be added to the solvent before, during or after the addition of the rubber compound.

It is preferred that the tackifying resin be compatible with the rubber compounds which are present in the adhesive compositions of this invention.

These tackifying resins are preferably soluble in the rubber compounds and vulcanize to form a homogeneous rubber material. A tackifying resin which bleeds out of the rubber or forms a heterogeneous material upon vulcanization is considered to be incompatible with the rubber.

Examples of suitable tackifying resins are resinous tackifiers such as indene resins, rosins, coumarone resins, oil-soluble phenolic resins, coumarone-indene resins, rosin plus polyterpene resins, glycerol esters of hydrogenated rosins, pentaerythritol esters of hydrogenated rosin, hydrogenated rosin, glycerol esters of polymerized rosin, maleic anhydride-modified rosin and rosin derivatives, partial esters of styrene-maleic acid copolymers and chlorinated biphenyls.

The amount of tackifying resin may vary over a broad range. For example, it may range from about 5 to 70 parts by weight and more preferably from about 10 to 50 parts by weight based on 100 parts by weight of the rubber.

Any emulsifying agent which is capable of emulsifying the composition may be employed in the compositions of this invention. Generally, the emulsifying agent can be cationic, anionic, or non-ionic, with the particular emulsifying agent or combination of emulsifying agents being adjusted by those skilled in the art to provide the desired emulsification characteristics. Suitable emulsifiers include mono and diglycerides of edible fats and oils; sorbitan fatty acid esters, such as sorbitan monooleate, sorbitan monolaurate, sorbitan monopalmitate, sorbitan monostearate, sorbitan dioleate, sorbitan tristearate, sorbitan trioleate, etc.; polyoxyalkylene sorbitol fatty acid esters, such as polyoxyethylene sorbitan monolaurate, monopalmitate, monostearate, monooleate, trioleate, etc.; polyoxyalkylene sorbitol esters, such as polyoxyethylene sorbitol oleate, laurate, etc.; polyoxyethylene esters, such as polyoxyethylene stearates, polyoxyethylene palmitates, polyoxyethylene laurates, etc.; polyoxyalkylene ethers, e.g., polyoxyethylene lauryl ether, cetyl ether, stearyl ether, oleyl ether, tridecyl ether, etc.; polyoxyethylene fatty glycerides; polyoxyalkylene alkyl amines; N-cetyl-N-ethylmorpholinium ethosulfates; N-soya-N-ethylmorpholinium ethosulfates; alkylaryl sulfonates; quaternary amine acetates; polyoxyethylene nonyl phenols; sodium dioctylsulfosuccinates; morpholine oleate, triethanolamine stearic acid salts, etc. In some cases where the emulsifying agent is a salt, such as a salt of an amine, the amine and the acid portion of the amine salt are added separately to the reaction mixture or are added as separate components of the reaction mixture and the amine salt emulsifier is formed in situ. Thus, where the emulsifier is a material such as morpholine oleate, the oleic acid is added separately from the morpholine to produce the emulsifying agent.

Mixtures of emulsifying agents may be employed in the adhesive compositions. Preferably, the emulsifying agent is an anionic emulsifier such as a sulfonated dodecylbenzene and more preferably a sodium salt of dodecylbenzenesulfonate or a derivative thereof.

A sufficient amount of the emulsifying agent should be employed in the composition to provide a stable emulsion; however an excess of the emulsifying agent will affect the adhesive properties of the composition. Thus, it is preferred that the amount of emulsifying agent range from about 2 to 10 parts and more preferably from about 5 to 10 parts by weight of emulsifying agent per 100 parts by weight of rubber.

Water is used in sufficient amount to provide for the desired emulsification of the solvent dispersion and for the proper solids content. It is preferred that the resultant aqueous composition contain less than about 30 percent by weight of organic solvent based on the weight of the aqueous emulsion.

Moreovoer, it is preferred that the rubber compound dispersed in the water range from about 2 to 30 percent by weight and more preferably from about 5 to 20 percent by weight based on the weight of the water. Thus, the amount of water is not critical and may range from about 300 to 5000 parts by weight of water and more preferably from about 500 to 2000 parts by weight of water per 100 parts by weight of the rubber compound.

The aqueous adhesive is applied to either of the rubber stocks to be bonded, e.g., to the bottom of an extruded tread and/or to a carcass composition by spraying, dipping, brushing or flooding and after drying the adhesive, the tread is contacted with the carcass. The dried adhesive forms a thin layer between the tread and carcass portion of the tire. The tire is then shaped and vulcanized in the usual manner in a suitable mold.

The resultant aqueous emulsion can be used, for example, as an undertread cement to bond vulcanizable tread stocks to carcass portions of a tire or as an adhesive for bonding tread ends. Likewise, the aqueous emulsion may also be used to bond polyester fibers, yarns, filaments, cords or fabric to vulcanizable rubber compounds to prepare radial, bias or belted-bias passenger tires, truck tires including the carcasses, belts, motorcycle and bicycle tires, off-the-road tires, transmission belts, V-belts, conveyor belts, hose, gaskets, rubbers, tarpaulins and the like.

Various embodiments of the invention are further illustrated in the following examples. In these examples all parts are by weight unless otherwise specified.

EXAMPLES 1 TO 3

A solvent dispersion is prepared from the following formulation:

| Component "A" Ingredients | Examples | | |
|---|---|---|---|
| | 1 Parts | 2 Parts | 3 Parts |
| Natural Rubber | 70 | 70 | 80 |
| Styrene-butadiene | 30 | 30 | 20 |
| Carbon black | 20 | 10 | 20 |
| Stearic acid | 1 | 1 | 2 |
| Zinc oxide | 2 | 3 | 3 |
| Sulfur | 2 | 2 | 1 |
| N—tert-butyl-2-benzothiazole sulfenamide | 2 | 2 | 1 |
| Xylene | 500 | 500 | 500 |

A mixture containing natural rubber, styrene-butadiene rubber, carbon black, zinc oxide, stearic acid, sulfur and N-tert-butyl-2-benzothiazole sulfenamide is milled on a two-roll mill at 60° C., removed and mixed with xylene with agitation. The resultant solvent dispersion is then mixed in the following manner to form Component "B".

| Component "B" Ingredients | Examples | | |
|---|---|---|---|
| | 1. Parts | 2 Parts | 3 Parts |
| Component "A" | 627 | 619 | 628 |
| Tackifying agents: | | | |
| Piccopale ®-100 BHT (available from Hercules, Inc.) | 88 | 87 | 153 |
| Pentalyn ®-H (available from Hercules, Inc.) | — | 25 | — |
| Emulsifying agent: | | | |
| Sodium dodecylbenzenesulfonate | 25 | 25 | 28 |
| Water | 750 | 743 | 838 |

The tackifying resins are mixed with the solvent dispersion (Component "A") and then the solvent dispersion is mixed with an emulsifying agent and water on a Cowles mixer. The water is added in increments of about 100 parts by weight with a one-minute mix time between each increment.

The resultant aqueous emulsion (Component "B") is then applied to the surface of 7×10 inch sheets of rubber stock which has been calendered on a two-roll mill to a thickness of about 0.07 inches. The coated stock is dried for 2 hours at room temperature and then placed on a 7×10 inch rubber coated nonwoven fabric sheet. A 3×10 inch piece of release paper is placed over the coated surface of rubber stock, leaving a 4×10 inch area exposed.

Another piece of 7×10 inch uncoated calendered rubber stock is placed on top of the coated sheet. Another piece of 7×10 inch rubber coated nonwoven fabric sheet is then placed over the calendered rubber stock. The slab is then placed in a 7×10 inch mold and pressed-cured at 150° C. for 45 minutes. The cured slab is removed from the mold and cooled to room temperature. The slab is cut into 10 (1×7 inch) strips. The 1×7 inch strips are pulled at 180° peel test at the rate of 1 inch/minute. The test specimens consist of 1×7 inch flexible material bonded to another 1×7 inch flexible material to give a 1×4 inch face to face bond surface.

The green strength of the adhesive composition is determined by coating 7×10 inch sheets of unvulcanized rubber with the adhesive composition and then dried for 2 hours at room temperature. The test sheets are then placed face to face, but separated by a 3×10 inch piece of polyethylene. The test sheets are then cut into 10 (1×7 inch) strips of rubber and pulled at 180°.

The results of the peel test after heat aging for one hour at 120° C. and the green strength are shown in Table I.

TABLE I

| Example No. | Peel Test | | Green Strength | |
|---|---|---|---|---|
| | 1 hour/120° C. | | | |
| | lbs/sq. in. | lbs/sq. in. | lbs/sq. in. | lbs/sq. in. |
| 1 | 65 | 25 | 5.0 | 3.5 |
| 2 | 85 | 30 | 4.9 | 2.5 |
| 3 | 76 | 34 | 5.4 | 2.5 |

EXAMPLES 4 TO 8

A solvent dispersion is prepared from the following formulation.

| Component "A" Ingredients | Examples | | | | | Comparison Example parts |
|---|---|---|---|---|---|---|
| | 4 parts | 5 parts | 6 parts | 7 parts | 8 parts | |
| Natural Rubber | 70 | 70 | 30 | 30 | 30 | 70 |
| Styrene-Butadiene | 30 | 30 | 70 | 70 | 70 | 30 |
| Carbon black | 10 | 10 | 10 | 10 | — | 10 |
| Stearic acid | 1 | 1 | 1 | 1 | 1 | 1 |
| Zinc oxide | 3 | 2 | 3 | 3 | 3 | 3 |
| Sulfur | 2 | 1 | 2 | 2 | 2 | 2 |
| N—tert-butyl-2-benzothiazole sulfenamide | 1 | 1 | 2 | 2 | 2 | 1 |
| Xylene | 500 | 500 | 500 | 500 | 500 | 1000 |

A mixture containing natural rubber, styrene-butadiene rubber, carbon black, stearic acid, zinc oxide, sulfur and N-tert-butyl-2-benzothiazole sulfenamide is milled on a two-roll mill at about 60° C. to a Mooney viscosity of about 50 ML. The mixture is removed from the mill and dissolved in xylene to form the solvent dispersion. The solvent dispersion is first mixed with tackifying resins and then emulsified with water and an emulsifying agent in a high speed dispersator to form an aqueous emulsion. The ingredients employed in the aqueous emulsion are shown below:

| Component "B" Ingredients | Examples | | | | | Comparison Example parts |
|---|---|---|---|---|---|---|
| | 4 parts | 5 parts | 6 parts | 7 parts | 8 parts | |
| Component "A" | 617 | 615 | 618 | 618 | 608 | 1117 |
| Tackifying Agents: | | | | | | |
| Piccopale ® -100 BHT (available from Hercules, Inc.) | 86 | 86 | 43 | 49 | 61 | 86 |
| Pentalyn ® -H (available from Hercules, Inc.) | 25 | — | 87 | 105 | 122 | 25 |
| Emulsifying agent: Sodium dodecylbenzene sulfonate | 25 | 25 | 26 | 25 | 24 | — |
| Water | 740 | 738 | 1781 | 1730 | 1824 | — |

The adhesive properties of the resultant aqueous emulsion (Component "B") are determined in accordance with the procedure described in Examples 1 to 3. The results of the Peel Test after one hour at 120° C. and the green strength are shown in Table II.

TABLE II

| Examples | Peel Test 1 hour/120° C. | | Green Strength | |
|---|---|---|---|---|
| | Maximum lbs/sq. in. | Minimum lbs/sq. in. | Maximum lbs/sq. in. | Minimum lbs/sq. in. |
| 4 | 85 | 30 | 5.3 | 3.8 |
| 5 | 65 | 25 | 5.0 | 3.5 |
| 6 | 86 | 36 | 3.0 | 2.6 |
| 7 | 93 | 34 | 4.3 | 3.5 |
| 8 | 86 | 47 | 5.2 | 3.5 |
| Comparison Example | 65 | 28 | 5.0 | 2.8 |

The Peel Test in Table II shows that the aqueous adhesive composition of this invention has a value which is equal to or better than that of a solvent adhesive composition.

What is claimed is:

1. A process for bonding unvulcanized rubber compounds which comprises coating at least one surface of the rubber compounds to be bonded together with an aqueous emulsion, drying the coated surface, contacting the coated surface of the rubber compounds and thereafter vulcanizing the rubber compounds, said aqueous adhesive emulsion is prepared by dispersing a premilled mixture containing rubber selected from the group consisting of natural rubber, synthetic rubber and mixtures thereof, a rubber reinforcing agent in an amount of from about 10 to 40 parts by weight per 100 parts by weight of rubber, a vulcanizing agent in an amount of from about 1 to about 8 parts by weight per 100 parts by weight of rubber, said vulcanizing agent is selected from the group consisting of sulfur, sulfur containing compounds, organic peroxides, metallic oxides, selenium and tellurium and an accelerator that is compatible with the mixture and is selected from the group consisting of mono- and di-sulfides, thiocarbamates, sulfenamides, thiazoles, quanidines, fatty acids having from 10 to 22 carbon atoms and oxides of zinc and magnesium with up to about 600 parts by weight per 100 parts by weight of rubber of an organic solvent for the rubber, and from about 5 to 70 parts by weight per 100 parts by weight of rubber of a tackifying resin which is soluble in the organic solvent to form a solvent dispersion, said organic solvent is selected from the group consisting of aliphatic hydrocarbons, cyclic hydrocarbons, aromatic hydrocarbons, naphtha and chlorinated hydrocarbons and thereafter emulsifying the solvent dispersion in the presence of an emulsifying agent and water to form an aqueous emulsion, in which the emulsifying agent is selected from the group consisting of anionic, cationic and non-ionic emulsifying agents and mixtures thereof.

2. A process for building a rubber tire which comprises coating a surface of tread stock with an aqueous adhesive emulsion, drying the coated surface, contacting the coated surface of the tread stock with a portion of a tire carcass and thereafter vulcanizing the tread stock and tire carcass, said aqueous adhesive emulsion is prepared by dispersing a premilled mixture containing rubber selected from the group consisting of natural rubber, synthetic rubber and mixtures thereof, a rubber reinforcing agent in an amount of from about 10 to 40 parts by weight per 100 parts by weight of rubber, a vulcanizing agent in an amount of from about 1 to about 8 parts by weight per 100 parts by weight of rubber, said vulcanizing agent is selected from the group consisting of sulfur, sulfur containing compounds, organic peroxides, metallic oxides, selenium and tellurium and an accelerator that is compatible with the mixture and is selected from the group consisting of mono- and di-sulfides, thiocarbamates, sulfenamides, thiazoles, quanidines, fatty acids having from 10 to 22 carbon atoms and oxides of zinc and magnesium with up to about 600 parts by weight per 100 parts by weight of rubber of an organic solvent for the rubber and from about 5 to 70 parts by weight per 100 parts by weight of rubber of a tackifying resin which is soluble in the organic solvent to form a solvent dispersion, said organic solvent is selected from the group consisting of aliphatic hydrocarbons, cyclic hydrocarbons, aromatic hydrocarbons, naphtha and chlorinated hydrocarbons and thereafter emulsifying the solvent dispersion in the presence of an emulsifying agent and water to form an aqueous emulsion, in which the emulsifying agent is selected from the group consisting of anionic, cationic and non-ionic emulsifying agents and mixtures thereof.

3. The process of claim 1, wherein the rubber is natural rubber.

4. The process of claim 2, wherein the rubber is natural rubber.

5. The process of claim 1, wherein the rubber is a mixture of natural rubber and synthetic rubber.

6. The process of claim 2, wherein the rubber is a mixture of natural rubber and synthetic rubber.

7. The process of claim 1, wherein the tackifying resin is added after the rubber, reinforcing agent, vulcanizing agent and accelerator are added to the organic solvent.

8. The process of claim 2, wherein the tackifying resin is added after the rubber, reinforcing agent, vulcanizing agent and accelerator are added to the organic solvent.

9. The process of claim 1, wherein the emulsifying agent is an anionic emulsifying agent selected from the group consisting of sulfonated dodecylbenzene, sodium salts of dodecylbenzenesulfonate and derivatives thereof.

10. The process of claim 2, wherein the emulsifying agent is an anionic emulsifying agent selected from the group consisting of sulfonated dodecylbenzene, sodium salts of dodecylbenzenesulfonate and derivatives thereof.

11. The process of claim 1, wherein the tackifying resin is selected from the group consisting of indene resins, rosins, coumarone resins, oil-soluble phenolic resins, coumarone-indene resins, rosin-polyterpene resins, glycerol esters of hydrogenated rosins, pentaerythritol esters of hydrogenated rosin, hydrogenated rosin, glycerol esters of polymerized rosin, maleic anhydride-modified rosin, rosin derivatives, partial esters of styrene-maleic acid copolymers and chlorinated biphenyls.

12. The process of claim 2, wherein the tackifying resin is selected from the group consisting of indene resins, rosins, coumarone resins, oil-soluble phenolic resins, coumarone-indene resins, rosin-polyterpene resins, glycerol esters of hydrogenated rosins, pentaerythritol esters of hydrogenated rosin, hydrogenated rosin, glycerol esters of polymerized rosin, maleic anhydride-modified rosin, rosin derivatives, partial esters of styrene-maleic acid copolymers and chlorinated biphenyls.

13. The process of claim 1, wherein the accelerator is selected from the group consisting of thiuram disulfide, selenium diethyldithiocarbamate, zinc dibutyldithiocarbamate, zinc diethyldithiocarbamate, zinc dimethyldithiocarbamate, zinc 2,2'-dithiobisbenzothiazole, tetramethylthiuram monosulfide, diphenylquanidine, N-cyclohexyl-2-benzothiazole sulfenamide, N-tert-butyl-2-benzothiazole sulfenamide, 2-mercaptobenzothiazole and benzothiazyl disulfide.

14. The process of claim 2, wherein the accelerator is selected from the group consisting of thiuram disulfide, selenium diethyldithiocarbamate, zinc dibutyldithiocarbamate, zinc diethyldithiocarbamate, zinc dimethyldithiocarbamate, zinc 2,2'-dithiobisbenzothiazole, tetramethylthiuram monosulfide, diphenylquanidine, N-cyclohexyl-2-benzothiazole sulfenamide, N-tert-butyl-2-benzothiazole sulfenamide, 2-mercaptobenzothiazole and benzothiazyl disulfide.

15. The process of claim 1, wherein the rubber is natural rubber, the vulcanizing agent is sulfur, the accelerator is N-tert-butyl-2-benzothiazole, the rubber reinforcing agent is carbon black, the tackifying resin is pentaerythritol esters of hydrogenated resin, the emulsifying agent is sodium dodecylbenzene sulfonate and the organic solvent is xylene.

16. The process of claim 2, wherein the rubber is natural rubber, the vulcanizing agent is sulfur, the accelerator is N-tert-butyl-2-benzothiazole, the rubber reinforcing agent is carbon black, the tackifying resin is pentaerythritol esters of hydrogenated resin, the emulsifying agent is sodium dodecylbenzene sulfonate and the organic solvent is xylene.

* * * * *